No. 654,425. Patented July 24, 1900.
H. WARD.
WIRE FENCE MACHINE.
(Application filed Nov. 11, 1899.)

(No Model.) 5 Sheets—Sheet 1.

Witnesses: Inventor:
Harry Ward,
By Banning & Banning & Sheridan,
Attys.

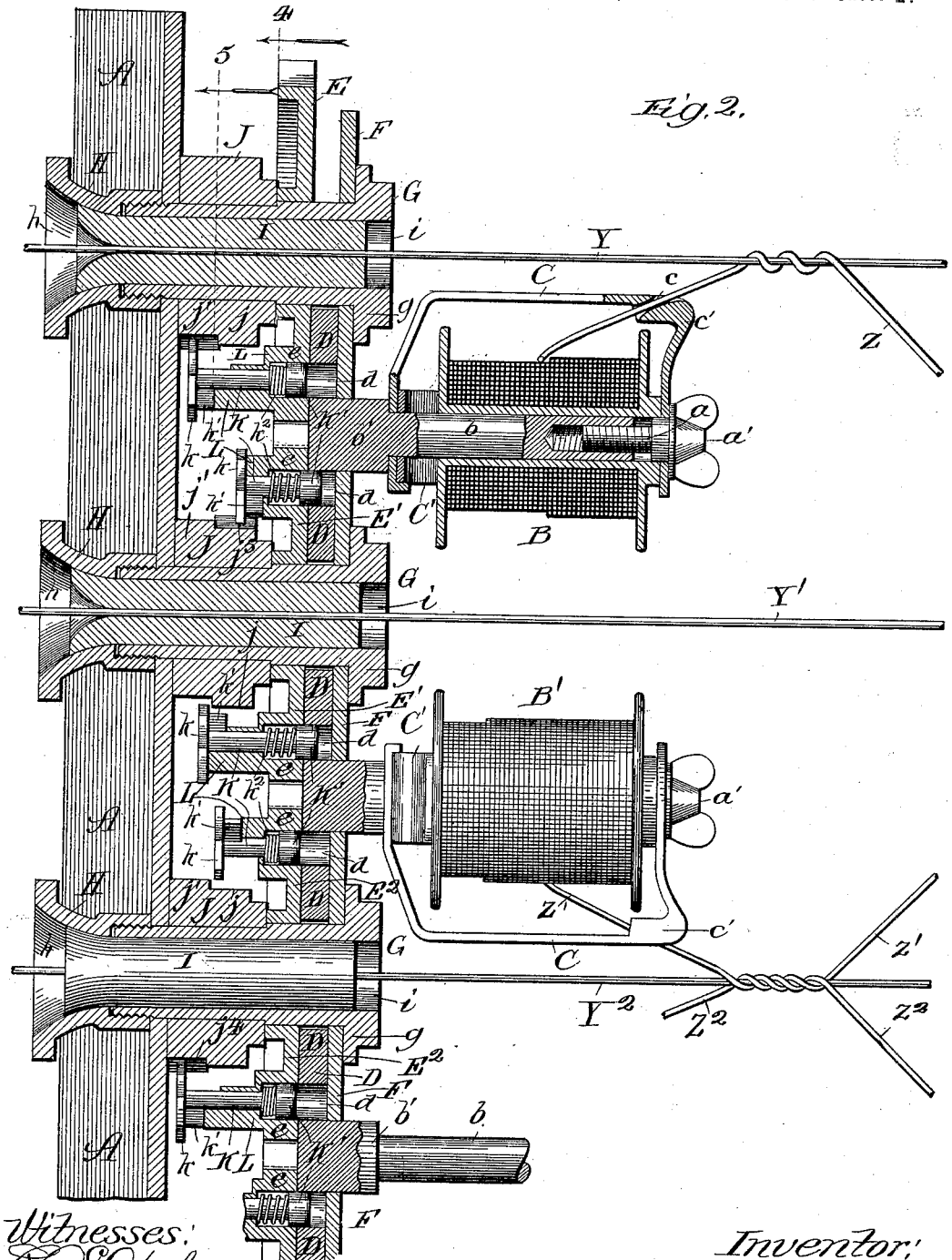

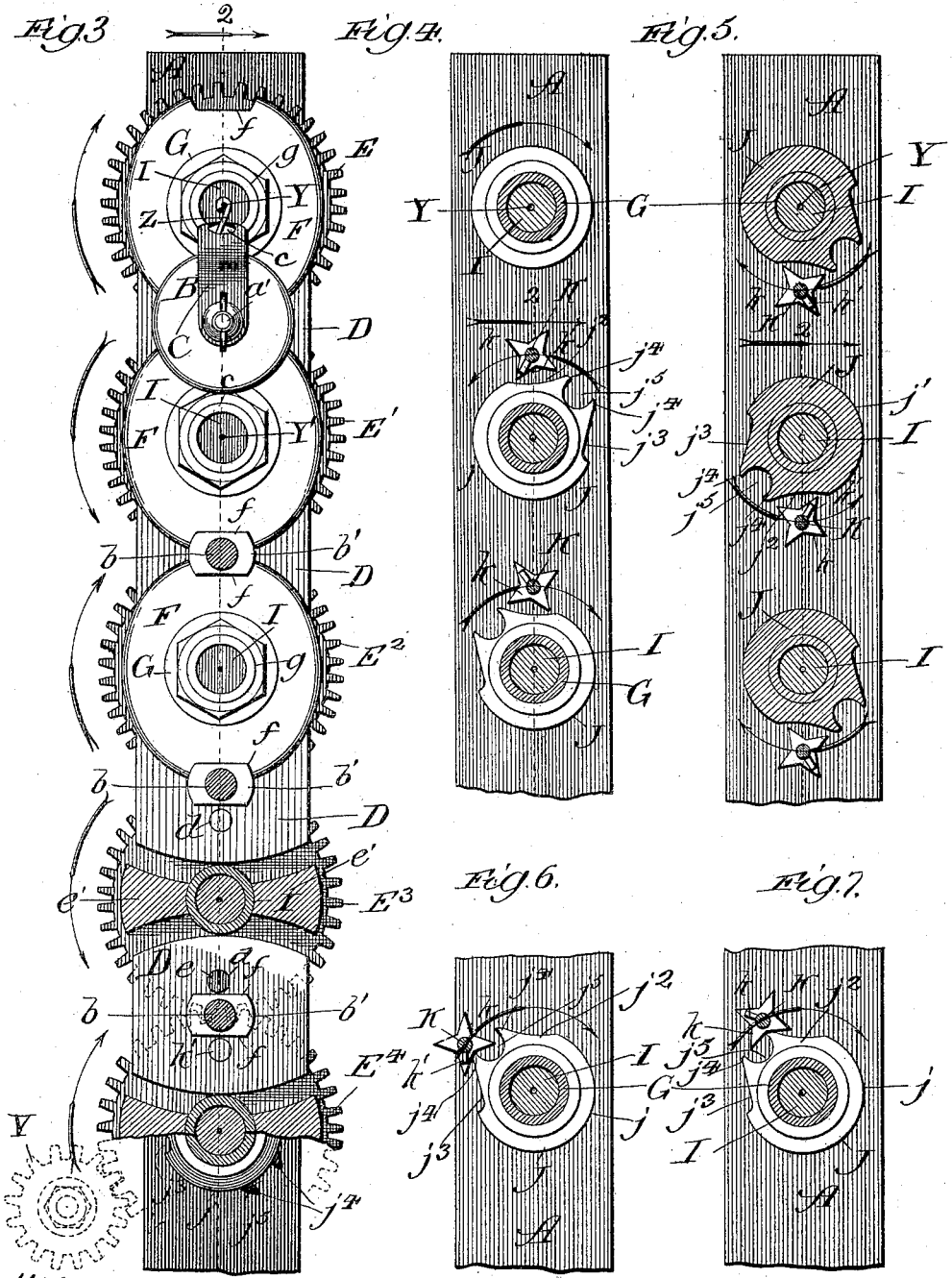

No. 654,425. Patented July 24, 1900.
H. WARD.
WIRE FENCE MACHINE.
(Application filed Nov. 11, 1899.)

(No Model.) 5 Sheets—Sheet 4.

Witnesses: Inventor:
Harry Ward,

No. 654,425. Patented July 24, 1900.
H. WARD.
WIRE FENCE MACHINE.
(Application filed Nov. 11, 1899.)
(No Model.) 5 Sheets—Sheet 5.
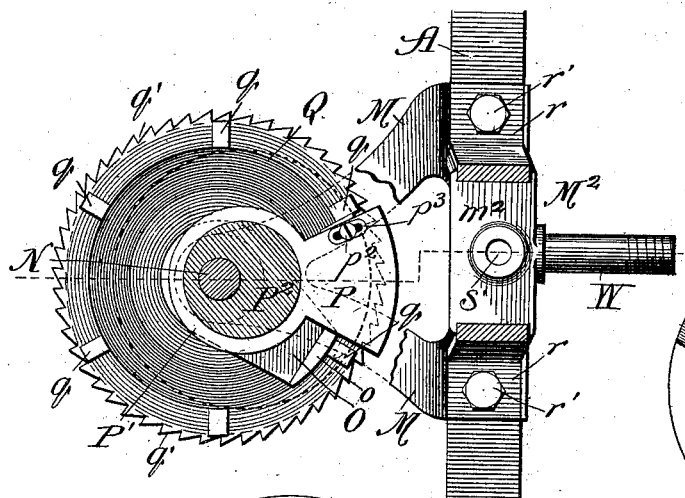
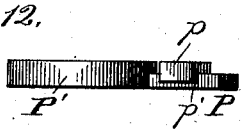
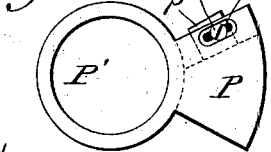
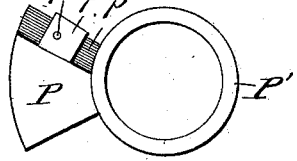
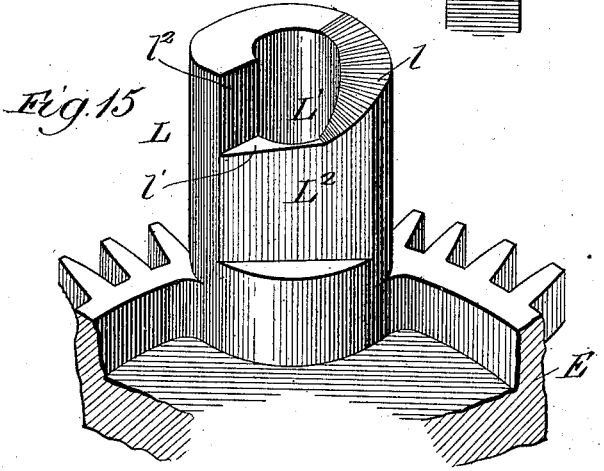
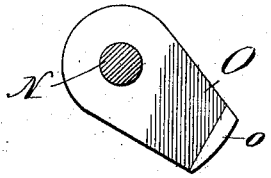
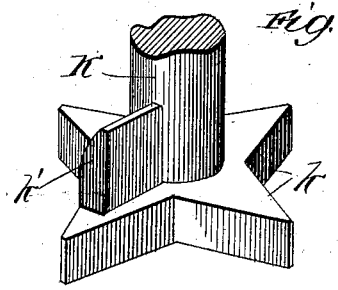
Witnesses:
Chas. E. Gaylord.
Thomas C. McGregor.
Inventor:
Harry Ward,
By Banning & Banning & Sheridan,
Attys.

United States Patent Office.

HARRY WARD, OF KOKOMO, INDIANA, ASSIGNOR OF ONE-HALF TO JOHN E. FREDERICK, OF SAME PLACE.

WIRE-FENCE MACHINE.

SPECIFICATION forming part of Letters Patent No. 654,425, dated July 24, 1900.

Application filed November 11, 1899. Serial No. 736,596. (No model.)

*To all whom it may concern:*

Be it known that I, HARRY WARD, a citizen of the United States, residing at Kokomo, Indiana, have invented certain new and useful Improvements in Wire-Fence Machines, of which the following is a specification.

This invention relates to wire-fencing machines of that class which travels along and produces a diamond-shaped woven-wire fence and which may be termed "portable" machines.

The object of my invention is to construct a machine of this class so that the operation of the meshing devices will be alternate from a continuous rotation in the same direction of the power and to impart a receding movement to the machine as the wire is woven and have such movement automatically performed by the operation of the power which actuates the mesh-weaving mechanism; and the invention consists in the several features of construction and combination of parts hereinafter described and claimed.

Figure 1:
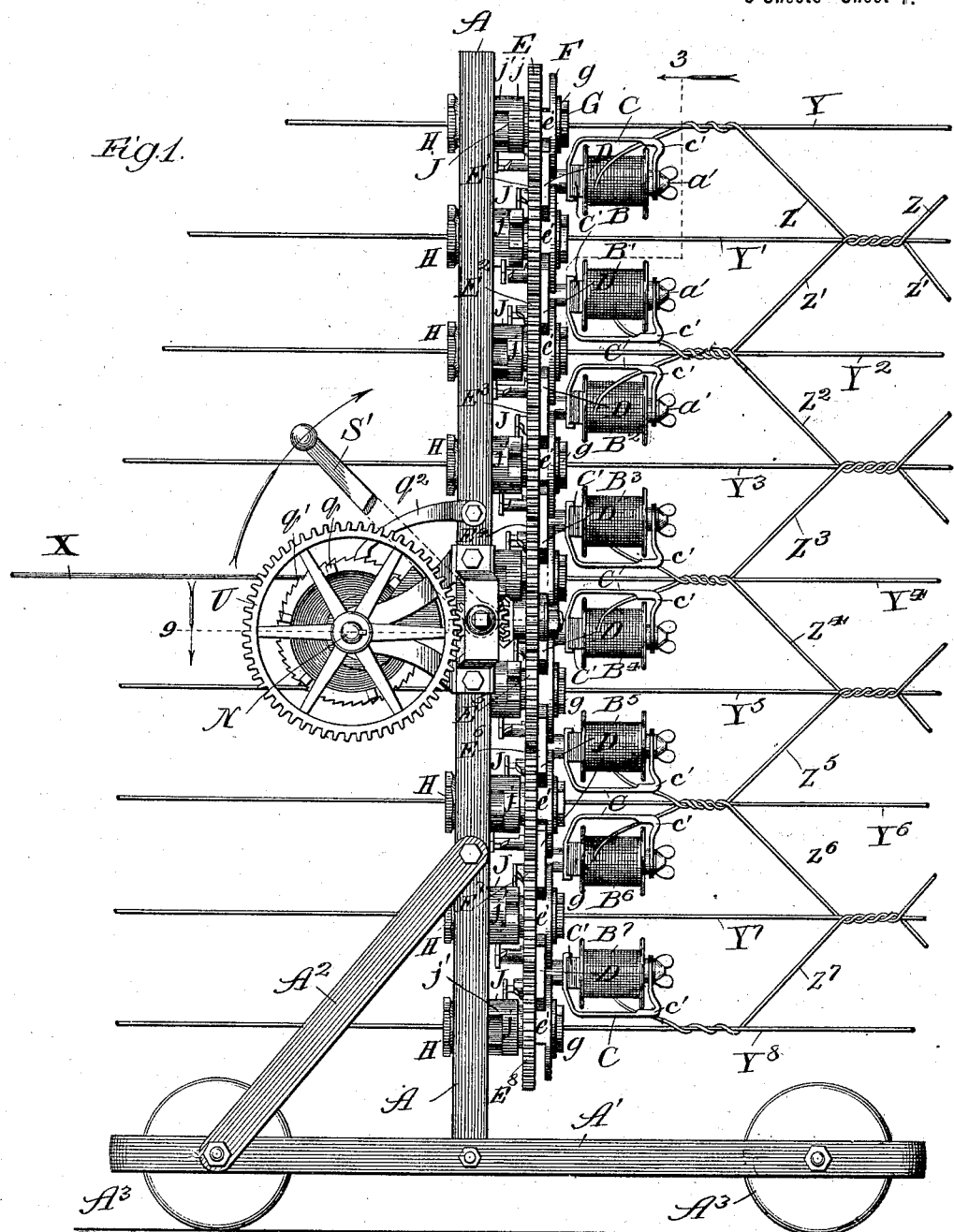
Figure 8:
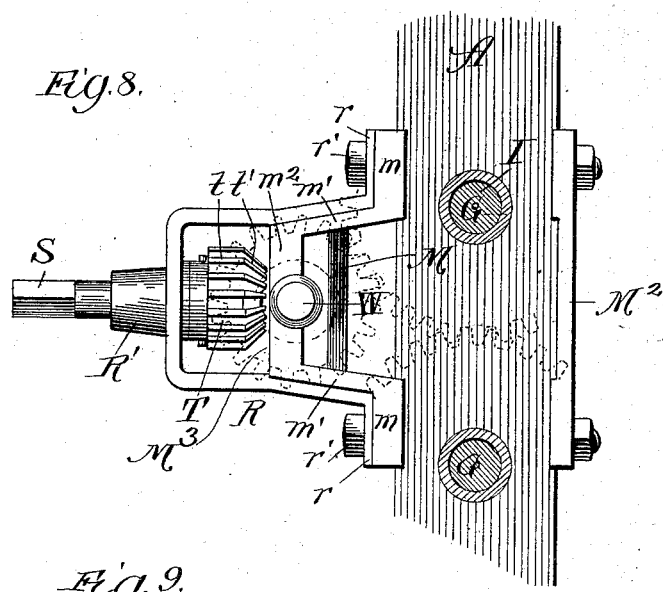
Figure 9:
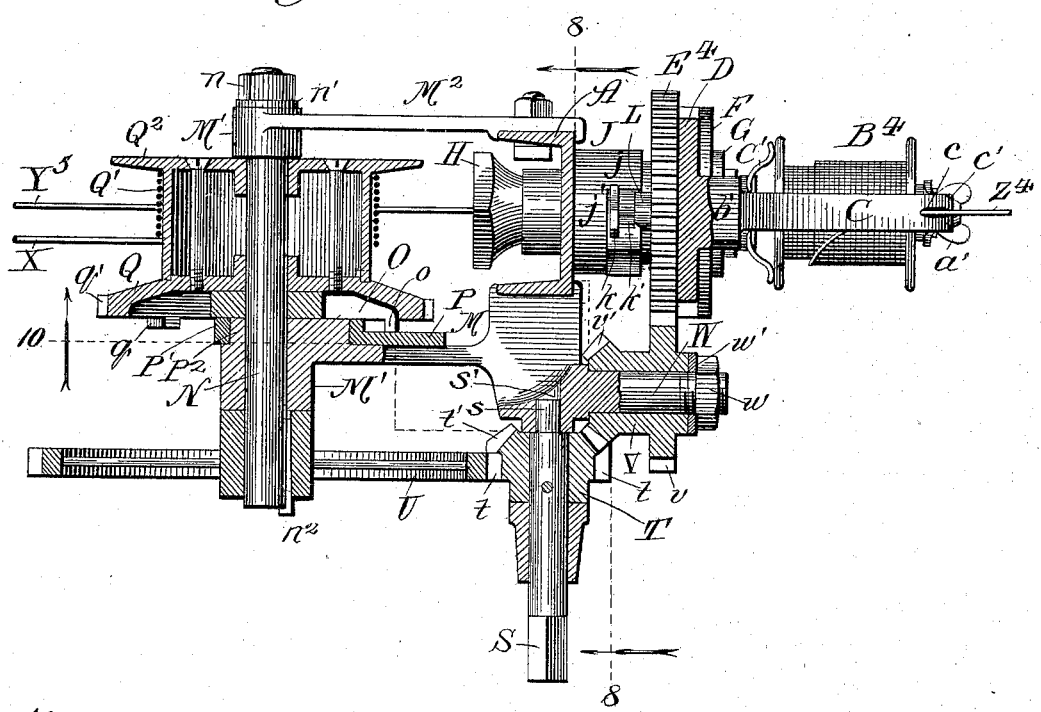

In the drawings, Figure 1 represents a side elevation of my improved wire-fence machine; Fig. 2, an enlarged vertical sectional elevation of the upper portion of the machine, taken on lines 2 of Figs. 3, 4, and 5; Fig. 3, a sectional elevation taken on the irregular line 3 of Fig. 1; Figs. 4 and 5, sectional elevations taken on lines 4 and 5, respectively, of Fig. 2; Figs. 6 and 7, further details of diagrammatic views illustrating different positions of one of the star-wheels in its travel around one of the cams; Fig. 8, a detail sectional elevation taken on line 8 of Fig. 9; Fig. 9, a plan sectional elevation taken on line 9 of Fig. 1; Fig. 10, a sectional elevation taken on the irregular line 10 of Fig. 9; Fig. 11, a detached elevation of the cam-ring and segmental plate, presenting the same face as shown in Fig. 10; Fig. 12, a plan or edge view of the same; Fig. 13, a view of the same part, showing the reverse side to that shown in Fig. 11; Fig. 14, a detail view showing the pushing-arm; Fig. 15, an enlarged broken sectional perspective view of a portion of one of the gears, showing the star-wheel socket and its cam-face; and Fig. 16, a detail perspective view of one of the star-wheels with its lug.

In carrying out my invention I construct a frame or standard A, preferably made of channel-iron, on which the operating mechanism is supported. This frame or standard is secured at its lower end in any suitable manner between side pieces A', having at the front and rear carrying-wheels $A^3$, and, as shown, a bracing $A^2$ is provided between the upright or standard and the side pieces. The upright or standard is to be of the requisite height for the number of wires required for the fence, and the machine is to be provided with the required number of spools for the number of mesh or woof wires to coact with the fence-wires. As shown, eight mesh or woof wire spools B, B', $B^2$, $B^3$, $B^4$, $B^5$, $B^6$, and $B^7$ are provided; but it will be understood that a greater or less number can be provided, as desired. Each spool is mounted on a spindle $b$, having an enlargement or head $b'$, and, as shown, the spool is held on the spindle by a threaded screw $a$, having a thumb-piece $a'$, the stem of the screw entering a screw-threaded hole in the spindle, as shown in Fig. 2. Each spool has coacting therewith a wire-carrier C in the form of a yoke or stirrup, with the arm at one end mounted loosely on the spindle and the arm at the opposite end mounted loosely on the head of the screw in the arrangement shown, and each carrier has an opening or passage $c$ in an enlargement $c'$, through which opening the wire from the spool runs. At the inner end of each spool is a flat spring or pressure plate C', by means of which the requisite friction on the spool end is produced for regulating the tension on the woof or mesh wire. The amount of frictional effect is regulated by means of the screw $a$, the tightening of the screw increasing the friction and the loosening of the screw decreasing the friction, thereby controlling the speed of the spool and the paying out of the wire. In this way the wire is guided in the operation of weaving and at the same time is maintained taut or strained.

The enlargement or head $b'$ of each spool-spindle is rigidly secured in a spool-plate D, or the plate and spindle can be formed of a single piece. Each spool-plate has therein holes $d$ directly opposite each other for the entrance of the engaging pins, by which the spool-carrier and spool are carried around with the gear. The machine has one more carrying-gear than the number of spools. As shown, the machine has nine gears E, E', E$^2$, E$^3$, E$^4$, E$^5$, E$^6$, E$^7$, and E$^8$. Each gear has a plate F, between which and the gear is a space to receive the spool-carrier plate, as hereinafter described. Each gear and its plate is mounted loosely on a sleeve or spindle G, having at one end a head $g$ to abut against the plate F and having its body extending through the face-plate of the standard or frame and provided with a screw-threaded end to receive a fastening-nut H, which nut, as shown in Fig. 2, has a flaring mouth $h$ for use in constructing a barb-wire fence with a mesh or woof. The sleeve or spindle G for use with straight smooth strand wires has an interior bushing I entered into the opening $i$, with a longitudinal hole of the requisite diameter for the passage of smooth or strand fence-wire, as shown in Fig. 2.

Each gear and its plate and sleeve or spindle, with the interior bushing, is the same for each strand-wire and the mesh or woof wire spool which coacts with the gears, as hereinafter described, and each gear in its body or web has an opening $e$ for the locking-pin, which engages the spool-carrier plate. Each gear and its face-plate may be cast or formed together with a rib $e'$ between and integral with them, or they may be made separate and connected together in any convenient manner. Each plate F at its periphery has a notch $f$ on opposite sides to receive the enlargement or head $b'$ of the spool-spindle and furnish a guide for properly positioning the carrier-plate to receive the engaging or locking pin.

Around each sleeve or spindle of a gear is a head J, fixed in any suitable manner to the frame or upright A, so as to be stationary or non-rotatable. This head or hub J has its periphery formed with two tracks or faces $j$ and $j'$ on opposite sides and in different planes, as shown in Figs. 2, 4, and 5. Each track or face has on one side an incline $j^2$ and on the opposite side an incline $j^3$, the two inclines terminating in points $j^4$, between which is a recess or depression $j^5$, as clearly shown in Figs. 4 and 5. The heads or hubs are arranged so as to have their projected portions $j^4$ in different radii for the different gears, as well as having the projected portions of each stud on opposite sides, so that one hub or head will be operative at different times and in different relations to the other adjacent hub or head by which the shifting of the mesh or woof wire spools is effected alternately, as hereinafter described.

A locking-pin K is provided for each gear, located on opposite sides of the gear, so that each gear has two locking-pins. Each locking-pin is provided with a head K', which enters the hole or recess $e$ of the gear, and each pin is projected or advanced with its head to enter the opening $d$ of the carrier-plate D by a coil-spring $k^2$, located around the stem of the pin between the head and the bottom of the opening or recess $e$, as shown in Fig. 2, or by other suitable means. Each stem has at its rear end a pointed or star wheel $k$, having on its face a lug, cam, or projection $k'$, as shown in Fig. 16. Each stem is mounted so as to slide in a socket L, extending out from the rear face of the gear, one socket having a longer projection than the other, and the stem of the pin of the long socket being of a correspondingly-increased length, so that the star-wheels of the two pins do not travel in the same plane, as clearly shown in Fig. 2. This arrangement brings one star-wheel in line to travel on the track or face $j$ of the hub or head and the other star-wheel in position to travel on the face or track $j'$ of the hub or head. Each socket, whether long or short, has its end on one side cut away, so as to have an incline $l$, which is continued in a straight face $l'$ until it meets a shoulder $l^2$, forming a space L' between the incline and the shoulder for the admission of the cam or lug $k'$ of the star-wheel when the pin of such wheel is projected or advances so as to have its end or head enter the opening $d$ of the carrier-plate. Each socket also has a cut-away portion L$^2$ adjacent to the opening L' to enable the socket to pass the projected portion of the hub or head J with the rotation of the gear.

As each carrier-gear revolves it carries with it the sockets and the locking-pins of the sockets, with their star-wheels. As each star-wheel travels around with the gear when its pin is in its receded position it has two of its points traveling on the circular track or face of the hub or head. These points continue in the same relation when passing over the incline $j^3$ as the gear revolves until the forward point reaches the position where it passes the first projection $j^4$, which permits the forward point of the star-wheel to turn into the recess $j^5$ and to turn out from such recess with the engagement of a point of the star with the opposite projection $j^4$. This produces a quarter-revolution of the star-wheel and its pin, so that at the end of two complete revolutions of the spool carrier or gear the star-wheel will have been quarterly rotated twice, bringing it into position where the cam or lug $k'$ can pass the face of the shoulder $l^2$ and permit the cam or lug to enter the opening L' for the spring to project the pin into engagement with the spool-carrier plate. The gear continues to revolve, and at the end of another revolution the cam or lug will have been carried to the commencement of the incline $l$. The continued revolution of the gear for one more turns carries the cam or lug up the incline $l$, withdrawing the pin from engagement with the carrier-plate as the cam or lug reaches the commencement of the straight face or end of the socket L.

It will be seen from the foregoing that the cam or lug $k'$ rides on the end face of the socket during two complete revolutions of the gear or spool-carrier and continues in a depressed position in the opening L' for two complete revolutions. The pins of each gear are simultaneously operated so as to be alternately projected and withdrawn. The projection of the pin locks a spool-carrier plate to a gear, and the withdrawal of a pin releases a spool-carrier plate from a gear, each engagement and release occurring with each two complete revolutions of a gear.

The arrangement of the heads or hubs and their projecting portions in relation to the star-wheels and the advancing and receding of the locking-pins is one that enables the spool B to be released from the gear E and caught by the pin of the gear E' for the spool B to be carried around with the gear E' for two revolutions, which again brings it into position where its carrier-plate will be released from the locking-pin of the gear E' and be in position to be engaged by the locking-pin of the gear E, so that the spool is alternately carried by the gears E and E' for two complete revolutions of each gear. The tracks of the heads or hubs, the star-wheels, and the cams and openings of the sockets for the stems of the pins enable this operation of transferring a spool-holder from one gear to another to be automatically performed with each complete two revolutions of a gear. It will be understood that the spool B' and the remaining spools are engaged, disengaged, and transferred by their respective gears in the manner already described with reference to the spool B and its gears. The arrangement and operation of the several spools are such that the spool B winds its mesh or woof wire Z onto the strand-wires Y and Y' alternately, the spool B' winds its mesh or woof wire Z' onto the strand-wires Y' and $Y^2$ alternately, the spool $B^2$ winds its mesh or woof wire $Z^2$ onto the strand-wires $Y^2$ and $Y^3$ alternately, the spool $B^3$ winds its mesh or woof wire $Z^3$ onto the strand-wires $Y^3$ and $Y^4$ alternately, the spool $B^4$ winds its mesh or woof wire $Z^4$ onto the strand-wires $Y^4$ and $Y^5$ alternately, the spool $B^5$ winds its mesh-wire $Z^5$ onto the strand-wires $Y^5$ and $Y^6$ alternately, the spool $B^6$ winds its mesh or woof wire $Z^6$ onto the strand-wires $Y^6$ and $Y^7$ alternately, and the spool $B^7$ winds its mesh or woof wire $Z^7$ onto the strand-wires $Y^7$ and $Y^8$ alternately. Each mesh or woof wire is wound onto its strand-wires two twists, and each mesh or woof wire is run back diagonally from its winding-point on one wire to its alternate wire, so as to produce a diamond mesh. The manner of winding and the mesh formed are shown in Fig. 1.

The several twistings of the different mesh or woof wires from the different spools around the different main wires are simultaneous from the revolutions of the several gears which coact with the several spool-carrier plates and spools, and the entire operation of crossing and twisting is performed automatically with the rotation of the spools from the gears and the transfer of one spool to two different gears at each alternate two revolutions.

The crossing and twisting operation will now be described and is as follows: Some of the carrier-gears rotate in one direction and some in the opposite direction, and for convenience of reference the gears may be divided into two sets, one set including the gears which have what may be termed a "forward" rotation and the other set including the gears which have what may be termed a "backward" rotation. The two sets will be designated as "first" and "second" for descriptive purposes, those of the first set comprising the gears E, $E^2$, $E^4$, $E^6$, and $E^8$, which have a forward rotation, and those of the second set comprising the gears E', $E^3$, $E^5$, and $E^7$, which have a backward rotation. The gears of the first set may revolve to the right, in which case the gears of the second set would revolve to the left, and the gears of the first set would produce a right-hand twist of the woof-wires on the strand-wire around which they revolve, while the gears of the second set would produce a left-hand twist of the woof-wires on the strand-wires around which they revolve. The gears revolve around alternate wires—that is to say, with the arrangement shown the gears E, $E^2$, $E^4$, $E^6$, and $E^8$ revolve around the wires Y, $Y^2$, $Y^4$, $Y^6$, and $Y^8$ and the gears E', $E^3$, $E^5$, and $E^7$ revolve around the wires Y', $Y^3$, $Y^5$, and $Y^7$. It will thus be seen that the outer gears coact with the outer wires and the intermediate gears coact with the intermediate wires, as above designated. The gears of the first set, with the parts as shown in Fig. 1, have completed a twist of the woof-wires on the strand-wires Y, $Y^2$, $Y^4$, $Y^6$, and $Y^8$, in which operation the gear E carried the spool B to twist the woof-wire of such spool twice around the strand-wire Y, the gear $E^2$ carried the spools B' and $B^2$ to twist the woof-wires of both of said spools twice around the strand-wire $Y^2$, the gear $E^4$ carried the spools $B^3$ and $B^4$ to twist the woof-wires of both of said spools twice around the strand-wire $Y^4$, the gear $E^6$ carried the spools $B^5$ and $B^6$ to twist the woof-wires of both of said spools twice around the wire $Y^6$, and the gear $E^8$ carried the spool $B^7$ to twist the woof-wire of said spool twice around the wire $Y^8$. During this operation the locking-pins of the gears named were engaged with the respective spools, as noted, and the locking-pins of the second set of gears were in a withdrawn position. At the completion of the twisting operation just described and as the machine commences to recede, as shown in Fig. 1, the pin-actuating devices of the first set of gears operate to recede the pins of all of said gears and release the wire-spools therefrom, and simultaneously with such recession and release the pin-actuating devices of the second set of gears operate to advance the pins of said gears and lock the spools with the respective gears, as shown in Fig. 2. The gear E' then will carry the spools B and B', the gear $E^3$ will carry the spools $B^2$ and $B^3$, the gear $E^5$ will carry the spools $B^4$ and $B^5$, and the gear E⁷ will carry the spools B⁶ and B⁷. These gears have a left-hand rotation, and consequently the spools will be revolved in the opposite direction from the preceding movement, twisting the woof-wires around the strand-wires left-handed instead of right-handed. The gear E' carries the spools B and B' to twist the woof-wire of both of said spools twice around the wire Y', the gear E³ carries the spools B² and B³ to twist the woof-wire of both of said spools twice around the strand-wire Y³, the gear E⁵ carries the spools B⁴ and B⁵ to twist the woof-wires of both of said spools twice around the strand-wire Y⁵, and the gear E⁷ carries the spools B⁶ and B⁷ to twist the woof-wires of both of said spools twice around the strand-wire Y⁷. At the completion of the twisting the pin-actuating devices for the second set of gears operate to recede the locking-pins of all of said gears, and at the same time the pin-actuating devices of the first set of gears simultaneously operate to advance the locking-pins of said gears to again lock the spools therewith to be carried around thereby, as before described. It will thus be seen that with each two revolutions of the gears one set is operative and the other set is inoperative as spool-carriers. One set twists the woof-wires of all the spools twice around its division of the strand-wires to the right, when the machine is receded, and the other set twists the woof-wires of all the spools twice around its division of the strand-wires to the left, when the machine is receded for the first set to act, and so on, the two sets acting alternately and on alternate strand-wires, thus producing a weaving of the woof-wires around the alternate strand-wires to form the mesh. The entire operation is automatically performed with the driving power for the several gears having a continuous rotation in one direction, the gears transferring the spools from one set to the other to wind around the respective wires as the rotation continues without any reversal of the driving power.

In the operation of making the fence it is necessary that the machine be receded as each twist is completed, the amount of recession depending upon the size of the mesh. My invention accomplishes this receding movement automatically by mechanism as follows: The upright or standard has secured thereto a support or arm M, extending rearwardly and terminating in a head M'. The opposite side of the upright has secured thereto an arm M², also terminating in a head M'. A shaft N is journaled in the heads of the arms so as to be free to revolve. This shaft has fixedly secured thereto in any suitable manner an arm O, having an outer turned end $o$, so that the arm rotates with the shaft. On the inner face of the support M is an eccentric P², encircled by a ring P' of a segmental plate P, the edge of which is engaged by the projection $o$ of the arm O so as to rotate the plate P. This plate carries on one edge a block $p$, located in a channel $p'$ and adjustable in or out by means of a screw $p²$, passing through a slot $p³$ in the body of the plate P, so that the block $p$ can be adjusted farther in or out, as may be required. Around the shaft N is loosely mounted a head Q of a drum Q', having an opposite head Q², loosely mounted on the shaft. The head Q has on its outer face a series of projections $q$ in position to be engaged by the block $p$ of the plate P as said plate is rotated. The engagement is governed entirely by the in-and-out position of the block $p$ in its relation to the movement of the arm of the plate eccentrically from the eccentric P². The arrangement is one by which the block can be moved out, and thereby cause a longer contact and engagement with a lug $q$, or the block can be moved inwardly, and thereby cause a shorter engagement with a lug $q$. The length of engagement determines the amount of receding movement of the machine. The drum Q is rotated from the shaft N intermittently through the engagements of the blocks $p$ with a lug $q$, and backward rotation after each advance is prevented by the engagement of a dog or pawl $q²$ with teeth $q'$ in the periphery of the wheel. The entire mechanism is operated from a shaft S, mounted in a head R' of a support R. The support R is of a yoke shape and its feet $r$ coincide with the feet $m$ of the support M, so that single bolts $r'$ secure both supports to the channel-iron frame-piece or standard, as shown in Fig. 8. The support M has an extension or side portion M³, formed of top and bottom pieces $m'$ and an end piece $m²$. The end piece has a journal-bearing $s'$ for the end $s$ of the shaft S, and the shaft is turned by means of a handle S'. This shaft has thereon a gear T, having straight teeth or leaves $t$ and beveled teeth or leaves $t'$. The straight teeth mesh with a gear U for rotating the shaft N, the gear being attached to the shaft by a key $n²$ and the opposite end of the shaft being held by a nut $n$ and washer $n'$. The bevel-gear $t'$ meshes with the bevel teeth or leaves $v'$ on a gear V, which gear is mounted on a spindle W and held thereon by a nut $w$ and washer $w'$. The gear V has straight teeth or leaves $v$, which, as shown, mesh with the gear E⁴ and drive such gear for that gear to drive the adjacent gears on each side, and so continue until all the carrier-gears are driven one from the other. It will be understood, however, that some other gear than E⁴ could be the one to engage with the gear V and do the driving. The rotation of the shaft S drives the gear U and rotates the shaft N, rotating the arm O, and through such arm operating the plate and rotating the drum Q'. The drum has secured thereto one end of a wire X, the other end of which is secured to a fence-post or other stationary object, so that the winding of the wire onto the drum recedes the entire machine. The parts are so timed that the receding occurs with the cessation of a complete twist or wind of the woof-wires, and the amount of recession is determined by the amount of rotation given to the drum from the engagement of the plate P with the head Q.

What I regard as new, and desire to secure by Letters Patent, is—

1. In a wire-fence machine, the combination of a mesh-wire spool, a spindle carrying the spool, and a revoluble wire-carrier and guide-yoke mounted at both ends on the spindle and straddling the spool and revoluble on the spindle and around the spool by the unwinding of the wire and provided with an eye or passage for the wire in its outermost corner, substantially as described.

2. In a wire-fence machine, the combination of a wire-mesh spool, a spindle carrying the spool, a revoluble wire-carrier and guide-yoke mounted at both ends on the spindle and straddling the spool and revoluble on the spindle and around the spool by the unwinding of the wire, and a tension-controller between one arm of the guide-yoke and the spool, substantially as described.

3. In a wire-fence machine, the combination of a wire-mesh spool, a spindle on which the spool is mounted, a base-plate for the spindle, a pair of carrier-gears, and interlocking means on each gear, each interlocking means having its operation dependent only on the rotation of its own gear and each operating to engage or disengage the base-plate through and from the rotation of the gear at the completion of a given number of revolutions, for the plate to be automatically transferred from gear to gear and be carried by the gears alternately without reversing the rotation of the gears, substantially as described.

4. In a wire-fence machine, the combination of a wire-mesh spool, a spindle on which the spool is mounted, a base-plate for the spindle, a pair of carrier-gears, a pair of interlocking pins on each gear, each pin of the pair independently operating and having its operation dependent only on the rotation of its own gear and alternately advanced and receded to engage and disengage the base-plate and transfer the plate with the spindle and spool from one gear to the other, substantially as described.

5. In a wire-fence machine, the combination of a wire-mesh spool, a spindle on which the spool is mounted, a base-plate for the spindle, a pair of carrier-gears, a pair of slidable pins on each gear, each pin of the pair independently operating and having its operation dependent only on the rotation of its own gear and alternately advanced and receded to engage and disengage the base-plate and automatically transfer the base-plate with the spindle and spool from one gear to the other through the rotation of the gear, substantially as described.

6. In a wire-fence machine, the combination of a wire-mesh spool, a pair of carrier-gears having opposite rotation and having the spool located centrally between the bite of the gears and interlocking means, each interlocking means independently operating and having its operation dependent only on the rotation of its own gear and each automatically operating to alternately engage and disengage the spool to and from one gear and transfer it to the other gear, thus imparting an opposite direction of twist to the wire without reversing the rotation of the gears, substantially as described.

7. In a wire-fence machine, the combination of a pair of carrier-gears having continuous rotation in opposite directions, a wire-mesh spool and independently and automatically operating means on each gear, each means having its operation dependent only on the rotation of its own gear, for the two means to coöperate and transfer the spool from gear to gear at the point of gear contact and have the spool alternately rotate in opposite directions for oppositely twisting the mesh-wires on the strand-wires without reversing the rotation of the gears, substantially as described.

8. In a wire-fence machine, the combination of a pair of carrier-gears having a continuous rotation in opposite directions, a pair of slidable pins on each gear, each pin of the pair independently operating and having its operation dependent only on the rotation of its own gear, a wire-mesh-spool spindle engaged and disengaged by the pins, and means for advancing and receding the pin independently and automatically through the rotation of the gears, substantially as described.

9. In a wire-fence machine, the combination of a pair of carrier-gears having a continuous rotation in opposite directions, a pair of slidable pins on each gear, a wire-mesh-spool spindle engaged and disengaged by the pins, a socket for each pin having a cam portion on its end face, a wheel for each pin provided with points and a projecting lug engaging the end face of the socket, and a stationary double track around which the wheels travel with the rotation of the gears for moving the slidable pins, substantially as described.

10. In a wire-fence machine, the combination of a carrier-gear, a socket on the gear having a cam portion on its end face, a slidable pin in the socket, a wheel having a series of points and provided with a projecting lug engaging the end face of the socket, a stationary track engaging the wheel with the rotation of the gear for giving the pin a partial rotation at the completion of a given number of revolutions of the gear, substantially as described.

11. In a wire-fence machine, the combination of a carrier-gear, two sockets on the gear, one socket having a longer projection than the other and each socket having a cam portion on its acting face, a slidable pin for each socket, each pin having a length proportioned to its socket, a wheel for each pin having a series of points and provided with a projecting lug engaging the end face of the socket, and a stationary head having a double track, one for each pointed wheel, engaging its wheel with the rotation of the gear for giving each pin a partial rotation at the completion of a given number of revolutions of the gear, substantially as described.

12. In a wire-fence machine, the combination of a carrier-gear, a socket on the gear having a cam portion on its end face, a slidable pin in the socket, a wheel having a series of points and provided with a projecting lug engaging the end face of the socket, and a stationary track having points engaging the points of the wheel and a recess between its points receiving a point of the wheel and giving the pin a partial rotation at the completion of a given number of revolutions of the gear, substantially as described.

13. In a wire-fence machine, the combination of a carrier-gear, a socket on the gear having a cam portion on its end face, a slidable pin in the socket, a spring for moving the pin in the socket, a wheel having a series of points and provided with a projecting lug engaging the end face of the socket, and a stationary track having points engaging the points of the wheel and a recess between the points receiving the points of the wheel in succession and giving the pin a partial revolution at the completion of a given number of revolutions of the gear, substantially as described.

14. In a wire-fence machine, the combination of a carrier-gear, a socket on the gear having a cam portion on its end face, a slidable pin in the socket, a coil-spring around the pin for moving it in the socket, and a wheel having a series of points and provided with a projecting lug engaging the end face of the socket for advancing and receding the pin in its socket, substantially as described.

15. In a wire-fence machine, the combination of a wire-mesh mechanism, a winding-drum for receding the wire-mesh mechanism and moving the fence-machine into a new position for another operation of said mechanism, a shaft carrying the winding-drum, a driving-gear for the winding-drum shaft, a main power-shaft, a compound driving-pinion on the power-shaft one gear of which meshes with the winding-drum-driving gear and the other gear of which meshes with a driving-gear of the wire-mesh mechanism for actuating both the wire-mesh mechanism and the winding-drum by one and the same motive power, substantially as described.

16. In a wire-fence machine, the combination of a wire-mesh mechanism, a winding-drum for receding the wire-mesh mechanism and moving the fence-machine into a new position for another operation of said mechanism, a shaft carrying the winding-drum, a main power-shaft, a driving-pinion on the power-shaft common to the winding-drum and wire-mesh mechanism, for revolving the drum and operating the mesh mechanism automatically, and a make-and-break connection between the winding-drum and its shaft connecting and operating the drum and shaft at the completion of an operation of the wire-mesh mechanism, substantially as described.

17. In a wire-fence machine, the combination of a rotatable shaft, an eccentric around the shaft, an arm fixed to and carried by the shaft, a plate loosely mounted on the eccentric and engaged by the shaft-arm, a winding-drum and stops on the winding-drum engaged by the plate on the eccentric and operating to intermittently rotate the drum and recede the mechanism, substantially as described.

HARRY WARD.

Witnesses:
  THOMAS A. BANNING,
  OSCAR W. BOND.